(12) United States Patent
Cavaliere

(10) Patent No.: US 6,505,838 B1
(45) Date of Patent: Jan. 14, 2003

(54) PRESSURE REGULATOR UTILIZING PLIABLE PISTON SEAL

(75) Inventor: John G. Cavaliere, Charlotte, NC (US)

(73) Assignee: Tactair Fluid Controls, Inc., Liverpool, NY (US)

( * ) Notice: Subject to any disclaimer, the term of this patent is extended or adjusted under 35 U.S.C. 154(b) by 0 days.

(21) Appl. No.: 09/847,784

(22) Filed: May 2, 2001

(51) Int. Cl.[7] .................................................. F16J 9/20
(52) U.S. Cl. ........................ 277/438; 277/436; 277/437; 277/439; 277/448
(58) Field of Search ................................. 277/436, 437, 277/438, 439, 448

(56) References Cited

U.S. PATENT DOCUMENTS

| | | | | |
|---|---|---|---|---|
| 3,174,761 A | * | 3/1965 | Workman | 277/448 |
| 3,357,319 A | * | 12/1967 | Hagerty | 277/439 |
| 3,975,028 A | * | 8/1976 | Satsumabayashi et al. | 277/391 |
| 5,071,198 A | * | 12/1991 | Troiani | 303/33 |
| 5,107,887 A | * | 4/1992 | White et al. | 137/505.42 |
| 5,435,576 A | * | 7/1995 | Rode | 277/362 |
| 5,586,569 A | * | 12/1996 | Hanning et al. | 137/116.5 |

* cited by examiner

Primary Examiner—Anthony Knight
Assistant Examiner—Michael Wayne White
(74) Attorney, Agent, or Firm—Wall Marjama & Bilinski LLP

(57) ABSTRACT

A pressure regulator uses a pliable seal to segregate a pressure confinement volume from the remaining cylinder volume. The pliable seal has a cross section comprising a pair of apexes that are disposed into grooves incorporated into the piston and the cylinder internal wall. The radii of the pliable seal establish a rolling contact to ensure pressure seal in the presence of seal deformation. The seal promotes linear regulator response and minimizes hysteresis causes by frictional forces of prior art piston rings.

13 Claims, 4 Drawing Sheets

PRESSURE REGULATOR UTILIZING PLIABLE PISTON SEAL

BACKGROUND OF THE INVENTION

This invention pertains to the field of pressure regulation.

The art of regulating gases or liquids from a higher pressure to a lower pressure has not seen many advances in the modem day. Generally, a pressure regulator is built using a cylinder together with a piston. The piston is used to actuate a valve, normally consisting of a spherical ball that rests in a circular seat. The present invention is useful for regulating the delivery pressure of liquids and gases. In the interest of brevity, much of the discussions presented herein refer only to gas pressure.

Visualizing the piston in an upright position with the piston rod oriented downward and acting on the spherical ball, regulated gas pressure acts against the underside of the piston. As the gas pressure under the piston falls, a spring forces the piston downward. This, in turn, opens the gas valve allowing the pressure to rise. The pressure setting for the regulator is adjusted by manipulating the amount of spring force acting upon the piston. In order to facilitate adjustment of the spring force acting downwardly on the piston, a spring stop is moved linearly along the non-pressure side of the cylinder that houses the piston. The gas pressure is contained below the piston by a rudimentary sliding seal between the outer perimeter of the piston and the inner wall of the cylinder.

In the known art, the seal material used most commonly is a rigid material. The rigid material, in many cases a carbon ring, is set into a groove machined into the piston and, having a minimum amount of pliancy, establishes a seal through a combination of normal and axial forces between the inner wall of the cylinder and the surfaces of the groove machined into the piston. A bellows has been used as an alternative to rigid piston rings. In these prior art regulators, a bellows is attached to the piston and to the inner wall of the cylinder. Each of these two known methods of containing the pressure under the cylinder are cursed with several undesirable attributes.

In the case of a rigid carbon ring, the pressure containment achieved is quite satisfactory. However, the use of such a rigid seal introduces heavy forces that must be overcome in the regulation process. In efforts to minimize these forces, the inner wall of the cylinder must be polished and coated with specialized lubricants. This reduces the break-away friction that must be overcome whenever the pressure must be adjusted. Use of a bellows essentially eliminates the hysteresis that results from this break-away friction phenomenon. A bellows seal, though, allows the bore area of the resultant regulator to vary. This causes an undesirable, non-linear regulation response.

The problems of hysteresis and non-linear response may not affect the majority of regulator applications, but they are significant obstacles in the art of precision regulation. This is especially true when the precision regulator is called upon to deliver a reference pressure of high caliber. Regulation hysteresis can render the precision reference ineffective due to the wild pressure swings that are exhibited every time the break-away friction in the cylinder seal is breached. The bellows seal is also inappropriate for precision reference applications because of the possibility of pressure oscillations attributable to the non-linear response of these regulators.

What is needed is a means of sealing the pressure side of a piston operating in a cylinder so that the frictional forces acting in the linear axis of the piston are minimized. This must be accomplished concurrently with the maintenance of a constant bore area for the regulator to balance the spring force. By achieving these two objectives, hysteresis effects can be mitigated and pressure oscillations resulting from a non-linear regulator response can be avoided.

SUMMARY OF THE INVENTION

The present invention comprises an apparatus for regulating pressure and a method of manufacturing said apparatus.

One aspect of the present invention is a piston seal that is composed of a pliable material. Any number of pliable materials are acceptable, but the present invention is best embodied using any one of a wide variety of pliable materials such as rubber, urethane, composite materials and even animal tissue or plant fiber. It should be noted that this list of possible pliable materials is meant to be illustrative and should not be construed as limiting the scope of the present invention. The pliable material is formed into a continuous seal with a cross section having several novel features. The cross section comprises a pair of apexes, one associated with an inner wall while the other is associated with an outer wall.

The cross section profile further comprises a concave depression disposed between the two apexes. A pressure cell is formed by the perimeter defined by the inner and outer walls immediately under the two apexes and the concave depression. The inner and outer walls drop tangentially from the radius of each apex to the base of the profile. The inner and outer walls further comprise a feature that they rise from the base sloped toward the center of the radii of their respective apexes.

The present invention further comprises a pressure regulator that incorporates the new pliable seal. This pressure regulator comprises a cylinder and a piston. Each of these elements has a seal receptacle that receives the pliable seal comprising, among other features, the two apexes. Ordinarily, the groove in the cylinder wall is disposed in a manner to correspond to the seal seat of the piston as the piston hovers about at an equilibrium position.

As the pliable seal is installed into the seal seat of a piston, one or both of the two apexes make a rolling contact with the upper surfaces of two receptacles, referred to as an annular internal groove on the cylinder internal wall or a seal seat on the piston. The depression disposed between the two apexes reduces the possibility that the pliable material will be sheared through when the piston moves axially within the cylinder. The regulator further comprises inlet and outlet ports for accepting high-pressure gas or liquid and discharging gas or liquid at a lower regulated pressure.

The pressure regulator according to the present invention uses the regulated pressure of discharged gas or liquid to further activate the piston seal. The pressurized gas or liquid acts on the piston seal to further increase the contact force between the piston seal and the piston. This same mechanism is used to increase the contact force between the piston seal and the cylinder. To aid this process, a convex surface defines the boundary of the pressure cell and this convex surface helps to ensure that pressure forces are transferred to the contact points rather than merely deform the profile of the piston seal.

Because the cross-sectional area of the new seal can be compressed into the cross sectional area of the seal seat disposed on the outer perimeter of the piston, the present invention includes a new method for manufacture of regulators incorporating the new pliable piston seal. This method defines the steps of fabricating a regulator with receptacles to accept the pliable seal in both the piston and the cylinder so that the two grooves correspond when the piston is in an equilibrium state. This process is augmented by installation of the pliable piston seal by compressing same into the cavity of the seal seat in the piston and then inserting the piston into the cylinder while the seal is so compressed.

BRIEF DESCRIPTION OF THE DRAWINGS

The foregoing aspects are better understood from the following detailed description of one embodiment of the invention with reference to the drawings, in which.

DETAILED DESCRIPTION OF THE INVENTION

Figure 1:
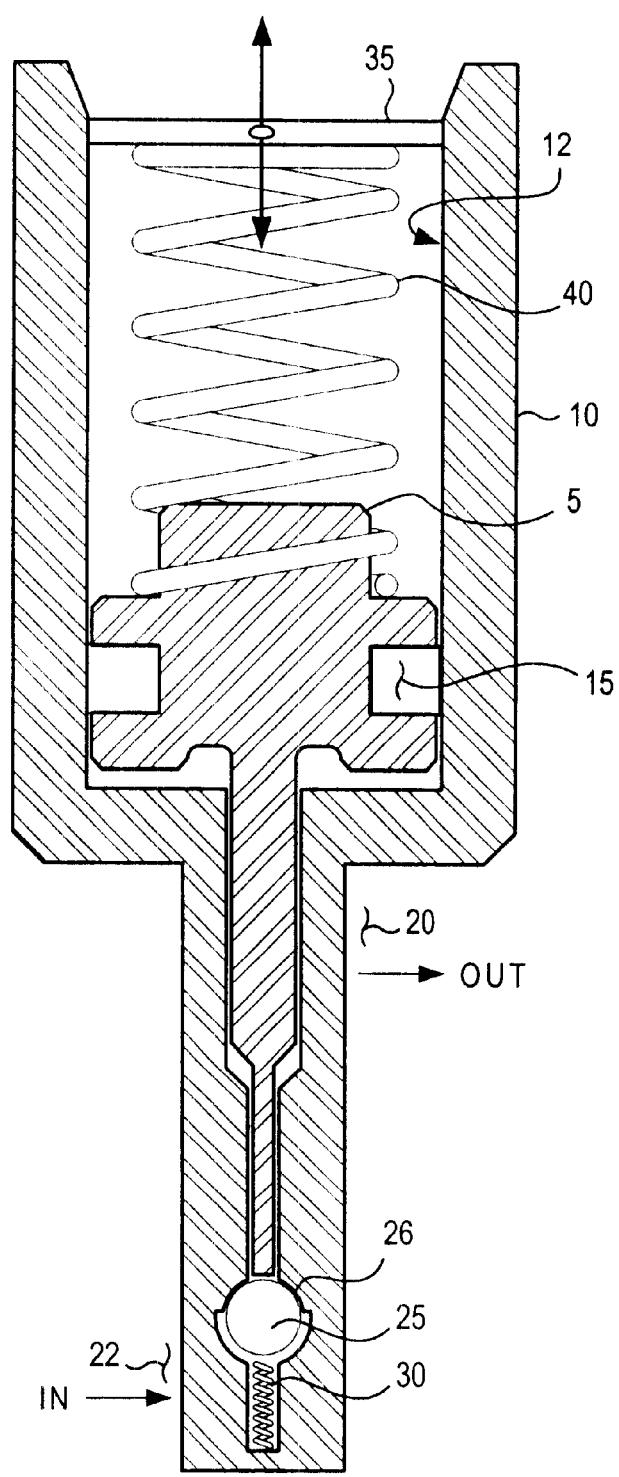
FIG. 1 is a pictorial diagram that depicts the cross section of a regulator exemplary of the prior art.

FIG. 1 is a pictorial diagram that depicts the cross section of a regulator exemplary of the prior art. It seems appropriate at this juncture to describe the general workings of a regulator. This description will help to more fully describe the utility of the present invention. As already described, a regulator is comprised of a piston 5 housed in a cylinder 10. The piston 5 is operated on by the force of a counter-spring 40. The amount of force imparted by the spring is adjusted by varying the compression distance of the spring. Adjusting the cylinder volume by moving a cylinder cap 35 axially within the cylinder does this.

An inlet 22 allows high pressure gas to enter a valve chamber. In many embodiments of prior art, the gas valve is comprised of a spherical element 25 situated on a circular seat 26. When the gas pressure within a confinement volume operates on the bottom surface of the piston, a force equal to the pressure times the bore area is created. When this force is approximately equal to the force imparted on the piston 5 by the counter spring 40, an equilibrium state is achieved. In this equilibrium state, no additional gas is let into the confinement volume. However, when the pressure in the confinement volume falls off, the counter spring forces the piston 5 to act upon the spherical element 25 of the gas valve. As the spherical element 25 is pushed away from the circular seat 26, high-pressure gas flows from the valve chamber into the confinement volume. Note that the outlet 20 allows delivery of the regulated pressure to end-users and that the delivered gas is drawn from the confinement volume.

In this prior art, the pressure acting on the underside of the piston 5 is confined by a piston ring 15. The piston ring 15 forms a barrier between the confinement volume and the remainder of the cylinder volume such that the piston 5 is free to move axially within the cylinder 10 as the force of the counter spring 40 and the regulated pressure act upon it. In order to reduce the amount of friction between the inner wall 12 of the cylinder 10 and the piston ring 15, the inner wall 12 must be polished and specially lubricated. Even in light of this special treatment, the frictional forces that must be overcome to enable movement of the piston will result in hysteresis in the regulated output.

Figure 2:
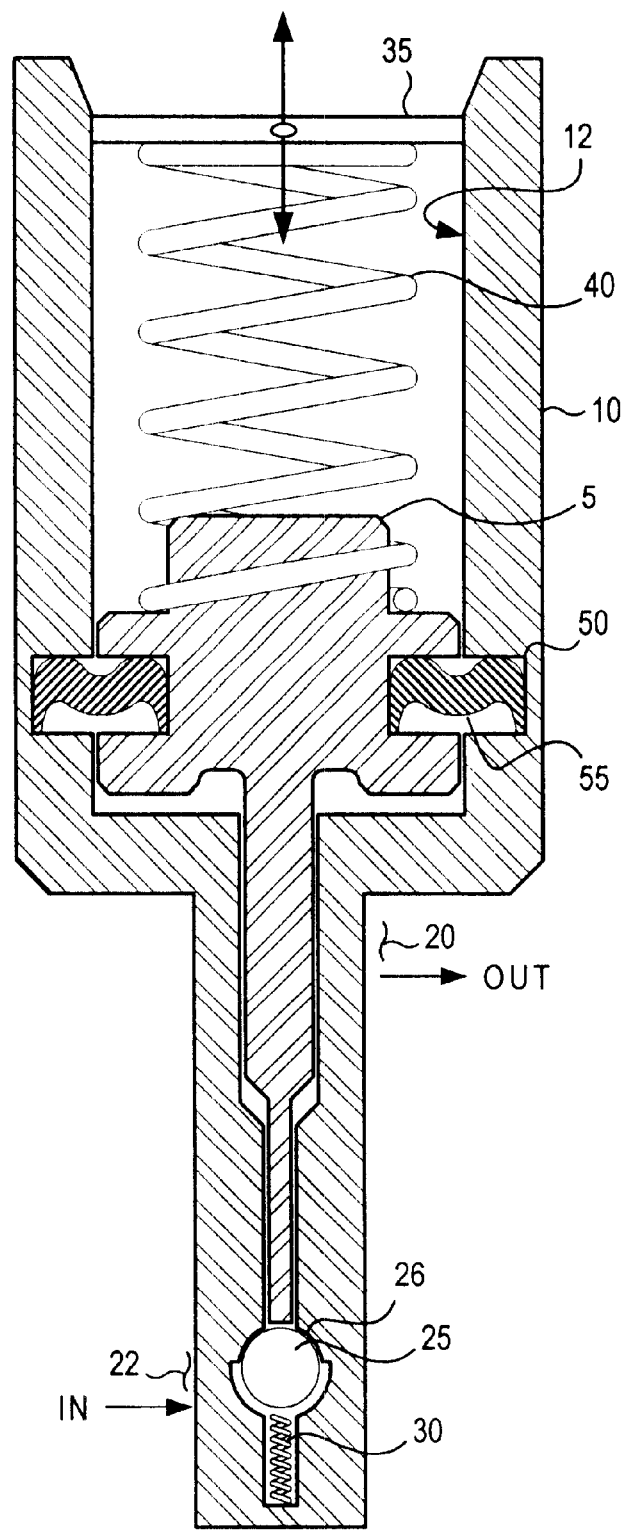
FIG. 2 is a pictorial diagram that depicts the structure of a pressure regulator according to the claimed invention.

FIG. 2 is a pictorial diagram that depicts the structure of a pressure regulator according to the claimed invention. A piston seal 55 having a novel cross section replaces the piston ring 15 of the prior art. The piston seal 55 reduces the break-away friction that causes regulator hysteresis to negligible levels. The piston seal 55 introduced here maintains a constant bore area. This promotes a linear regulation response. A counter spring 40 still acts upon the piston 5. Likewise, regulated pressure in the confinement volume acts on the piston 5 in opposition to the counter spring 40. All of the other elements of the prior art, such as adjustment of the regulation set point by moving a cylinder cap 35 and the use of a valve comprising a spherical element 25 and a circular seat 26, have been retained.

In the present invention, the inner wall 12 of the cylinder 10 no longer needs special preparation to reduce friction. The inner wall 12 does have a new feature. Specifically, the inner wall 12 now comprises an annular internal groove 50. This annular internal groove 50 is disposed opposite the seal seat of the piston when the piston 5 is situated in its equilibrium state.

Figure 3:
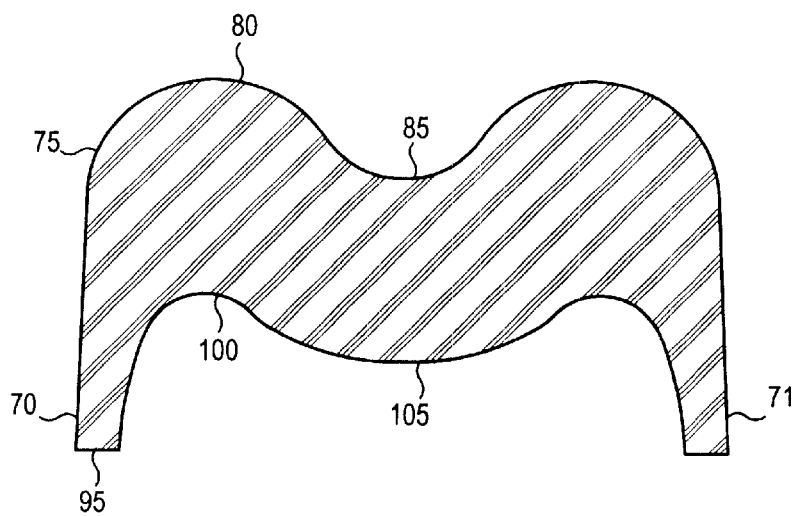
FIG. 3 is a pictorial depiction of the cross section of a piston seal according to the present invention.

FIG. 3 is a pictorial depiction of the cross section of a piston seal according to the present invention. The piston seal 55 has a unique cross section comprising several features attributable to functional requirements. First, the cross section comprises a pair of apexes 80 that straddle a depression 85. The depression comprises a radius. Further, the cross section comprises an inner wall and an outer wall (70 and 71). The cross section also comprises a base 95. The inner and outer walls descend from the apexes tangentially from the radius of each apex 75 toward the base. An additional feature that aids in the transfer of forces from pressure applied to the piston seal 55 from the containment volume side is a convex surface 105. The function of these various elements is best described in context of the piston seal as it is installed in the cylinder.

Figure 4:
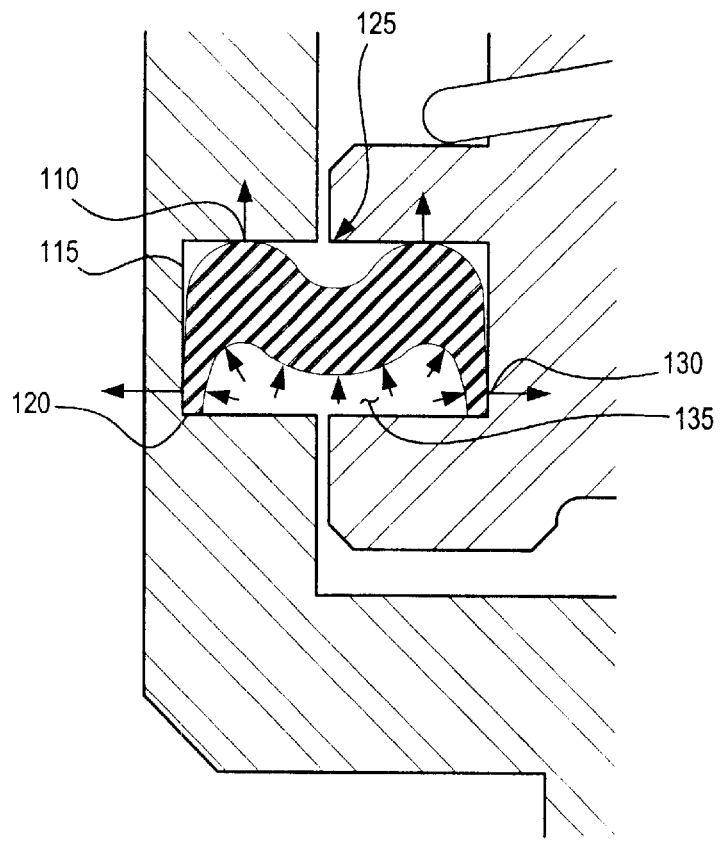
FIG. 4 is a pictorial diagram that depicts the piston seal as it is installed in the cylinder.

FIG. 4 is a pictorial diagram that depicts the piston seal as it is installed in the cylinder. When the piston seal 55 is installed, it is disposed in the annular seal seat of the piston 5 and the annular internal groove 50 of the cylinder internal wall 12. Noting the function of the two apexes, each is disposed to contact the upper surfaces of the annular seal seat and the annular internal groove. Pressure is presented under the cross section of the seal as depicted in the region 135. This region is referred to as a pressure cell. The force of the regulated gas is propagated through the seal upward to the apexes 80 to enable high contact force 110 between the seal and the upper surfaces of the annular seal seat and the annular internal groove.

Likewise, the pressure forces are propagated through the inner and outer walls (70 and 71) to effect a high contact force between the piston seal and the normal surfaces of the annular seal seat and the annular internal groove. The normal surface of the annular internal groove is depicted as reference numeral 115. By sloping each side wall inward toward the center of each apex radius, the side walls are encouraged to make a single-point contact to the piston and cylinder normal surfaces. This further promotes a high contact force by reducing the contact area in this region 130. Further promoting the transfer of these forces is the convex shape of the bottom of the piston seal 105. This convex shape ensures that the cross section of the seal does not conform to the pressure imparted to it, but rather will transfer the forces to the specified surfaces.

One additional feature of the novel cross section is the function performed by the concave depression 85. When the piston 5 moves axially in the cylinder, a rectangular seal disposed in the annular seal seat and the annular internal groove would be susceptible to shearing by the scissoring action formed by the outer perimeter 125 of the piston seal seat. By introducing a depression in the upper surface of the seal according to the present invention, clearance is provided for the traveling piston. This depression 85 also enables the apex radii to serve as a rolling contact between the piston seal 55 and the upper surfaces of the annular seal seat and the annular internal groove. As the piston moves up and down, the cross section of the piston seal 55 will be deformed, but the pressure contact will follow as the radii roll along these upper surfaces of the annular seal seat and internal groove.

Further enabling the present invention, the material selected for the piston seal must be pliable so that the seal will conform to the cavity formed by the annular seal seat and the annular internal groove. The material must be rigid to the extent that the pressures applied to the seal from the containment volume are properly transferred to the contact surfaces as described above. One additional selection criteria for the material is the ability of the material to be compressed in cross section so that the entire cross sectional area of the seal can be contained in the cross sectional area of the annular seal seat machined into the piston. This allows for simplified installation of the piston into the cylinder. When the piston is inserted into the cylinder so that the seal seat is aligned with the annular internal groove in the internal cylinder wall, the cross sectional area of the seal must be restored to its original profile by the resiliency of the selected material. A wide variety of materials exhibit this combination of characteristics, some of which include rubber, urethane, animal tissue, vegetable fiber, composite materials, thin-section metals and reinforced composite materials. This list is meant to be illustrative and should not be construed to limit the scope of the present invention.

Figure 5:
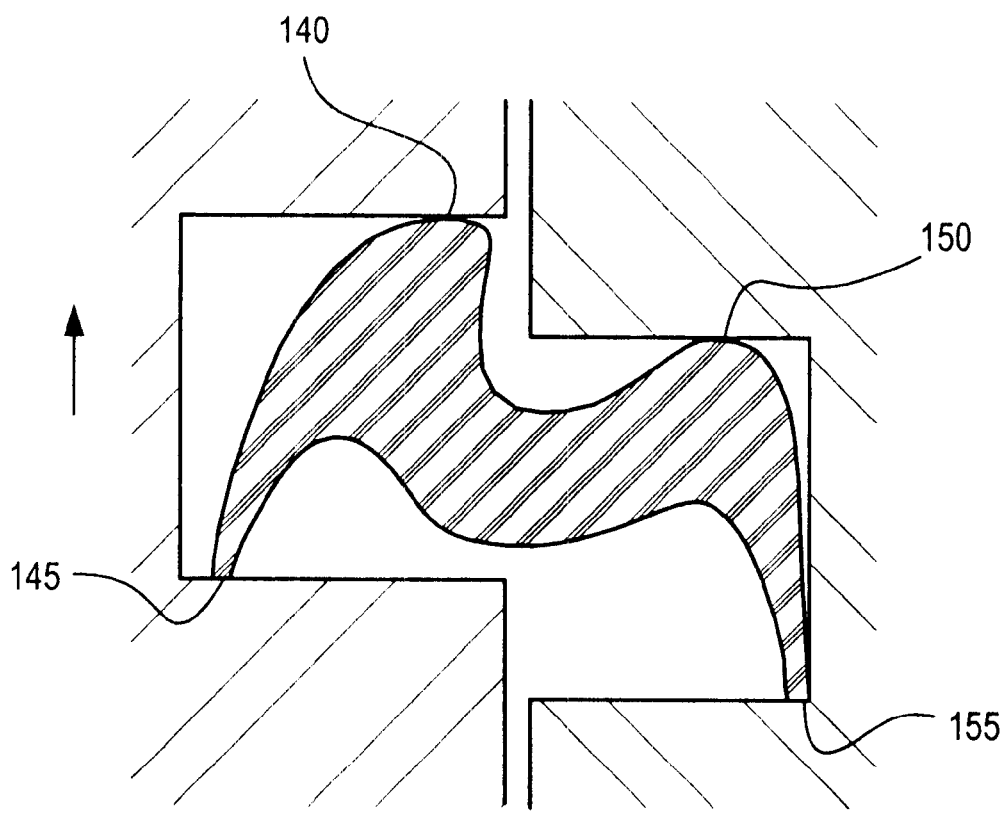
FIG. 5 is a pictorial diagram that depicts the seal contact points of a piston seal according to the present invention while the piston seal is deformed as a result of piston travel.

FIG. 5 is a pictorial diagram that depicts the seal contact points of a piston seal according to the present invention while the piston seal is deformed as a result of piston travel. Note that as the piston travels, the pliable seal will deform. During this deformation, one side of the seal will peel away from the normal surface of the seal groove or seat. The base of the seal will peal in this manner 145. Likewise, the apex of the seal will roll 150 during deformation of the opposing side of the seal.

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents. Some, but by no means all of the possible alternatives are described herein.

Although the descriptions proffered thus far relate to a piston seal, the same seal profile and sealing mechanism is applicable to linear applications. Such linear applications may include dams in various machines where the forces necessary to move the dam would result in hysteresis. Use of a linear variant of the seal would minimize these hysteresis effects.

What is claimed is:

1. A pressure regulator comprising:
    a piston comprising an outer perimeter and an annular seal seat disposed onto the outer perimeter wherein said seal seat comprises an upper surface and a normal surface;
    a cylinder comprising an internal wall and an annular internal groove disposed in the internal wall opposing the annular seal seat of the piston when the piston is situated in an equilibrium position wherein said internal groove comprises an upper surface and a normal surface;
    a piston seal comprising pliable material formed into a ring that is mounted within said seal seat and said internal groove wherein said seal further includes:
        a first apex having a first radius;
        a second apex having a second radius;
        a concave depression disposed between said first and second apexes;
        an outer wall;
        an inner wall;
        a pressure cell; and
        a base;
    an inlet port for receiving high pressure gas or liquid; and
    a outlet prot for discharging gas or liquid at a regulated pressure.

2. The pressure regulator of claim 1 wherein the piston seal is composed of a pliable material comprising one of rubber, urethane, animal tissue, vegetable fiber, composite materials, thin-section metals, and reinforced composite materials.

3. The pressure regulator of claim 1 wherein the piston seal is disposed such that the first radius contacts the upper surface of the annular groove disposed on the cylinder and the second radius contacts the upper surface of the annular seal seat disposed on the piston.

4. The pressure regulator of claim 3 wherein the contact between either the first radius and the upper surface of the annular groove disposed on the cylinder or the second radius and the upper surface of the annular seal seat disposed on the piston is a rolling contact.

5. pressure regulator of claim 1 wherein the piston seal is disposed such that the outer wall of the piston seal contacts the normal surface of the annular internal groove of the cylinder and the inner wall of the piston seal contacts the normal surface of the annular seal seat of the piston.

6. The pressure regulator of claim 1 wherein the piston seal is activated by pressurized gas or liquid collected in the pressure cell and wherein the pressurized gas or liquid causes an increase in contact force between the piston seal and the piston.

7. The pressure regulator of claim 1 wherein the piston seal is activated by pressurized gas or liquid collected in the pressure cell and wherein the pressurized gas or liquid causes an increase in contact force between the piston seal and the cylinder.

8. The pressure regulator of claim 1 wherein the piston seal is disposed such that the concave depression is approximately situated at the interface between the cylinder inner wall and the outer perimeter of the piston.

9. A method for manufacturing a pressure regulator comprising the steps of:
    machining a seal seat into the outer perimeter of a piston;
    machining an internal groove in the inside perimeter of a cylinder wherein the internal groove is disposed opposing the seal seat when the piston is in an equilibrium position;
    fabricating a piston seal having a cross-section that includes:
        a first apex having a first radius;
        a second apex having a second radius;
        a concave depression situated between the first apex and the second apex;

installing the piston seal into the seal seat and the internal groove by first compressing the cross-section of the piston seal into the seal seat; and inserting the piston into the cylinder while the cross-section of the seal is compressed into the seal seat.

10. A pressure regulator that includes:

a piston this is movably contained within a cylinder;

a first annular grooved formed in said piston and a second annular groove formed in said cylinder, said grooves being in opposed alignment when the piston is in an equilibrium position;

an annular ring seated within said grooves to provide a seal between the piston and the cylinder;

said ring comprising a first arcuate upper apex having a first radius, a second arcuate upper apex having a second radius, a concave depression disposed between said first and second apexes, an outer wall section that is mounted in sealing contact within said first groove and an inner wall mounted in sealing contact within said second groove and a pliable center section for conjoining said wall sections to provide axial movement between the piston and the cylinder without breaking said seal.

11. The pressure regulator of claim 10 wherein the wall sections are integral with the center section.

12. The pressure regulator of claim 11 wherein each wall section contains one of said arcuate upper apexes and a planar lower base, each wall section further includes an outer surface extending between the apex and the base that is tangent to the apex.

13. The pressure regulator of claim 12 wherein the each outer surface descend toward the base non-orthogonally so that the surface slopes inwardly from the base toward the apex.

* * * * *